(12) United States Patent
Ono et al.

(10) Patent No.: US 12,027,671 B2
(45) Date of Patent: Jul. 2, 2024

(54) LAMINATED BATTERY AND PRODUCTION METHOD THEREOF

(71) Applicant: TOYOTA JIDOSHA KABUSHIKI KAISHA, Toyota (JP)

(72) Inventors: Masato Ono, Nagoya (JP); Kazuhito Kato, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 723 days.

(21) Appl. No.: 17/026,537

(22) Filed: Sep. 21, 2020

(65) Prior Publication Data

US 2021/0104778 A1    Apr. 8, 2021

(30) Foreign Application Priority Data

Oct. 2, 2019 (JP) ................................. 2019-182298

(51) Int. Cl.
*H01M 10/0585* (2010.01)
(52) U.S. Cl.
CPC ............................... *H01M 10/0585* (2013.01)
(58) Field of Classification Search
CPC ....................... H01M 10/0585; H01M 10/0562
See application file for complete search history.

(56) References Cited

U.S. PATENT DOCUMENTS

| | | | |
|---|---|---|---|
| 6,387,564 B1 | 5/2002 | Yamashita et al. | |
| 2003/0224242 A1* | 12/2003 | Kaito | H01M 50/193 |
| | | | 429/231.95 |
| 2009/0029251 A1* | 1/2009 | Baba | H01M 4/661 |
| | | | 29/623.5 |
| 2014/0079992 A1 | 3/2014 | Tanaka | |
| 2015/0228951 A1 | 8/2015 | Yu et al. | |
| 2017/0373300 A1 | 12/2017 | Maeda et al. | |
| 2019/0097208 A1 | 3/2019 | Kawase et al. | |
| 2019/0123357 A1 | 4/2019 | Torita et al. | |
| 2019/0131603 A1 | 5/2019 | Park et al. | |
| 2020/0076002 A1 | 3/2020 | Okamoto et al. | |

FOREIGN PATENT DOCUMENTS

| | | |
|---|---|---|
| CN | 1251215 A | 4/2000 |
| CN | 1469503 A | 1/2004 |
| CN | 103548196 A | 1/2014 |

(Continued)

*Primary Examiner* — Osei K Amponsah
(74) *Attorney, Agent, or Firm* — Dickinson Wright, PLLC (57) ABSTRACT

Provided is a laminated battery superior in current collection properties. A laminated battery disclosed herein includes a plurality of power generation elements. Each of the power generation elements includes a first electrode layer, a second electrode layer, and a solid electrolyte layer interposed between the first electrode layer and the second electrode layer. The laminated battery includes a first collector. The plurality of power generation elements are laid up via the first collector. A dimension of a main surface of the first collector in at least one direction is smaller than a dimension of a main surface of the first electrode layer in the same direction. An insulating adhesive is disposed at a position straddling an edge of the first collector, such that the insulating adhesive bonds a main surface of one of the power generation elements and a main surface of a power generation element adjacent thereto.

7 Claims, 5 Drawing Sheets

(56) References Cited

FOREIGN PATENT DOCUMENTS

| | | |
|---|---|---|
| CN | 109713219 A | 5/2019 |
| JP | H0645005 A | 2/1994 |
| JP | 2012038425 A | 2/2012 |
| JP | 2017204377 A | 11/2017 |
| JP | 2019061952 A | 4/2019 |
| KR | 10-2015-0051901 A | 5/2015 |
| KR | 10-2019-0048312 A | 5/2019 |
| KR | 10-2019-0089071 A | 7/2019 |
| WO | 2016152565 A1 | 9/2016 |

\* cited by examiner

LAMINATED BATTERY AND PRODUCTION METHOD THEREOF

BACKGROUND OF THE INVENTION

1. Field of the Invention

The present disclosure relates to a laminated battery. The present disclosure also relates to a method for producing the laminated battery. The present application claims priority based on Japanese Patent Application No. 2019-182298, filed on Oct. 2, 2019, the entire contents of which are incorporated herein by reference.

2. Description of the Related Art

Ever higher performance is demanded from secondary batteries, such as lithium secondary batteries, as these become more widespread. All-solid-state batteries in which an electrolyte solution is replaced by a solid electrolyte have drawn attention as high-performance secondary batteries. Typically, all-solid-state batteries are provided with power generation elements each including a positive electrode, a negative electrode, and a solid electrolyte interposed between the positive electrode and the negative electrode.

Stacked-type all-solid-state batteries in which the power generation elements are laid up on each other are well known as all-solid-state batteries (see, for instance, Japanese Patent Application Publication No. 2017-204377). Japanese Patent Application Publication No. 2017-204377 discloses a feature in which, in order to fix stacked power generation elements (battery units), a thermoplastic resin as a bonding means is applied on a main surface of a first collector of a given battery unit, and the first collector of the given battery unit and a battery unit laid adjacent to the given battery unit are bonded by the thermoplastic resin.

SUMMARY OF THE INVENTION

In the above conventional configuration, however, an insulating thermoplastic resin is used on a main surface of the first collector, and in particular on both main surfaces of the first collector, and as a result, a region exists, on the collector, that cannot be used for current collection. Accordingly, there is room for improvement in terms of current collection properties.

Therefore, it is an object of the present disclosure to provide a laminated battery superior in current collection properties.

A laminated battery disclosed herein includes a plurality of power generation elements. Each of the power generation elements includes a first electrode layer, a second electrode layer, and a solid electrolyte layer interposed between the first electrode layer and the second electrode layer. The laminated battery includes a first collector. The power generation elements are laid up via the first collector. A dimension of a main surface of the first collector in at least one direction is smaller than a dimension of a main surface of the first electrode layer in the same direction. An insulating adhesive is disposed at a position straddling an edge of the first collector; such that the insulating adhesive bonds a main surface of one of the power generation elements and a main surface of a power generation element adjacent thereto.

Such a configuration allows providing a laminated battery having superior current collection properties.

In a desired implementation of the laminated battery disclosed herein, a dimension of the insulating adhesive is larger than a dimension of the first collector, in a stacking direction of the power generation elements.

The reliability of bonding by the insulating adhesive is higher in such a configuration.

In a desired implementation of the laminated battery disclosed herein, the insulating adhesive has voids in an interior thereof.

When the laminated battery is used while restrained, such a configuration allows curtailing excessive dimensional changes of the insulating adhesive, derived from a restraint pressure.

A method for producing a laminated battery disclosed herein includes the steps of: preparing a plurality of power generation elements each including a first electrode layer, a second electrode layer, and a solid electrolyte layer interposed between the first electrode layer and the second electrode layer; arranging a first collector and an insulating adhesive on the first electrode layer of one power generation element of the power generation elements; and arranging another power generation element of the power generation elements on the first collector. Herein, the insulating adhesive is disposed at a position other than on a main surface of the first collector with a dimension of the insulating adhesive being larger than a dimension of the first collector, in a stacking direction of the power generation elements.

Such a configuration allows producing a laminated battery having superior current collection properties.

In a desired implementation of the method for producing a laminated battery disclosed herein, the production method further includes a step of applying pressure on the insulating adhesive by applying pressure to a main surface of the power generation elements towards an outward direction from an inward position of the main surface.

By virtue of this configuration, excess insulating adhesive can be pushed out of the stack of the power generation elements, and in consequence the dimension of the insulating adhesive in the stacking direction of the power generation elements can be easily brought to a desired dimension.

DESCRIPTION OF THE PREFERRED EMBODIMENTS

Embodiments of the present disclosure will be explained below with reference to accompanying drawings. Any features other than the matter specifically set forth in the present specification and that may be necessary for carrying out the present disclosure (for instance, general configurations and production processes of laminated batteries which are not characterizing the present disclosure) can be grasped as design matters for a person skilled in the art based on conventional art in the technical field in question. The present disclosure can be carried out on the basis of the disclosure of the present specification and common technical knowledge in the relevant technical field. In the drawings below, members and portions that elicit identical effects will be explained while denoted with identical reference symbols. The dimensional relationships (length, width, thickness and so forth) in the drawings do not reflect actual dimensional relationships.

In the present specification, the term "battery" denotes power storage devices in general from which electrical energy can be drawn, and encompasses conceptually primary batteries and secondary batteries. In the present specification, the term "secondary battery" denotes a power storage device in general that can be charged and discharged repeatedly, and encompasses so-called storage batteries (i.e., chemical batteries) such as lithium ion secondary batteries, nickel-hydride batteries and nickel cadmium batteries, as well as capacitors (i.e., physical batteries) such as electrical double layer capacitors.

Figure 1:
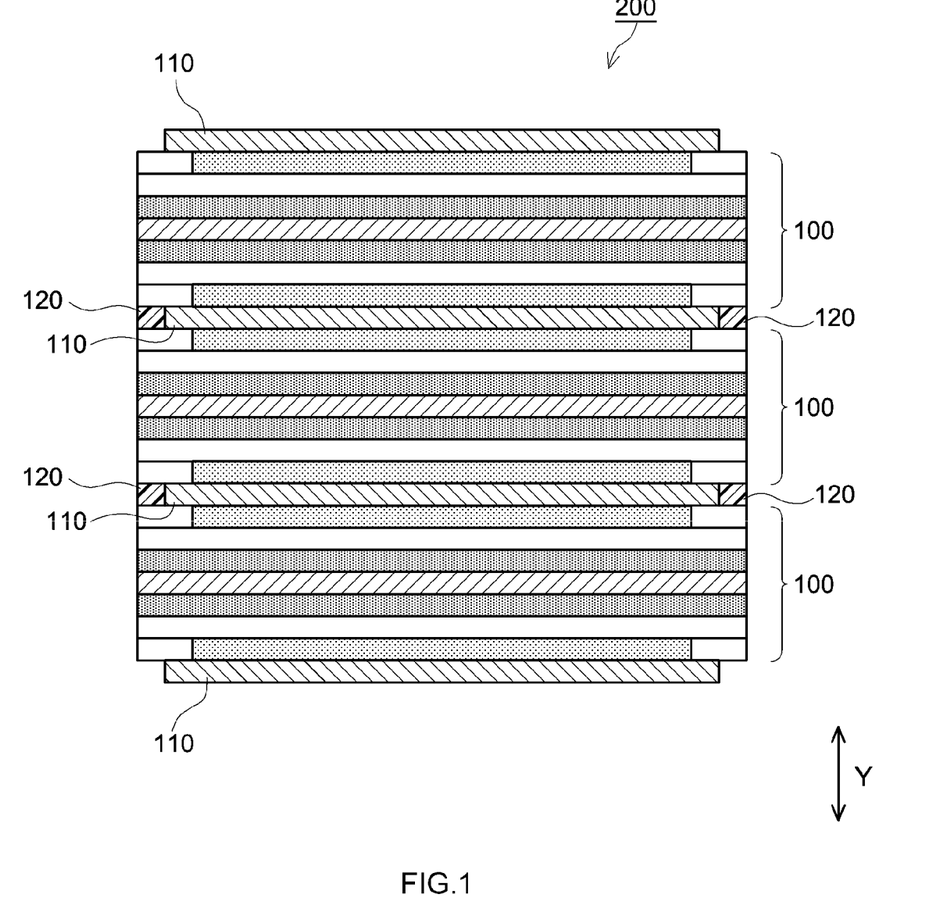
FIG. 1 is a schematic cross-sectional diagram illustrating an example of the configuration of a laminated battery according to an embodiment of the present disclosure.

FIG. 1 illustrates schematically the configuration of a laminated battery according to the present embodiment. FIG. 1 is a cross-sectional diagram along the width direction of a laminated battery provided with rectangular sheet-shaped electrodes.

As illustrated in FIG. 1, the laminated battery 200 is provided with a plurality of power generation elements 100. In the illustrated example, the laminated battery 200 is provided with three power generation elements, but the number of power generation elements is not particularly limited, so long as it is a plurality, i.e. two or more. The laminated battery 200 may include not less than 2 and not more than 50, or not less than 2 and not more than 20 power generation elements 100.

Figure 2:
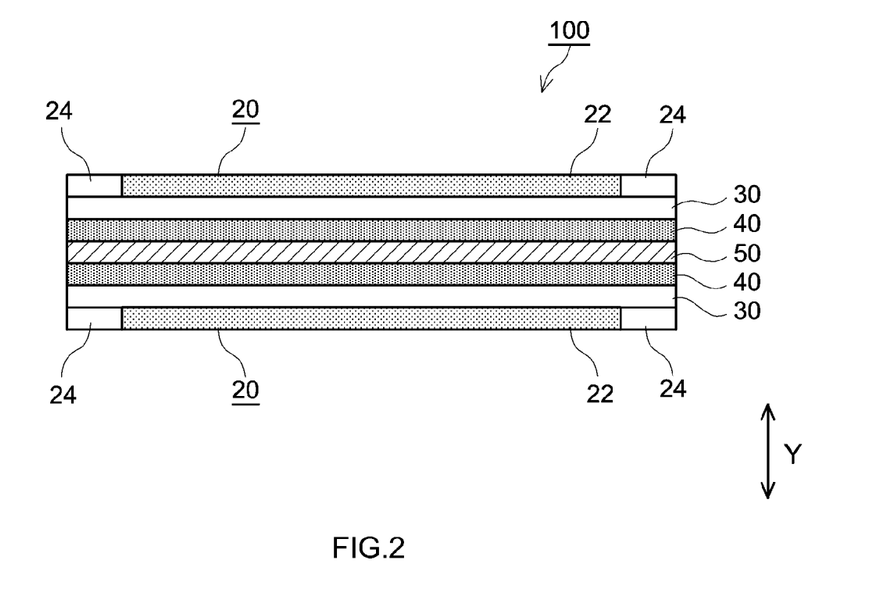
FIG. 2 is a schematic cross-sectional diagram illustrating an example of the configuration of a power generation element of a laminated battery according to an embodiment of the present disclosure.

FIG. 2 illustrates the specific configuration that each of the power generation elements 100 has. FIG. 2 is a cross-sectional diagram along the width direction of electrodes, and is also a cross-sectional diagram along the width direction of the power generation element 100.

Each power generation element 100 is provided with a positive electrode layer 20 as a first electrode layer, a negative electrode layer 40 as a second electrode layer, and a solid electrolyte layer 30 interposed between the positive electrode layer 20 and the negative electrode layer 40. The power generation element 100 may further include a negative electrode collector layer 50, as in the illustrated example. The negative electrode collector layer 50, the negative electrode layer 40, the solid electrolyte layer 30 and the positive electrode layer 20 are laid up sequentially in each power generation element 100. The positive electrode layer 20 opposes the negative electrode layer 40 across the solid electrolyte layer 30.

In the illustrated example, since a laminated battery 200 having a large number of stacked power generation elements 100 can be produced efficiently, the negative electrode layer 40, the solid electrolyte layer 30 and the positive electrode layer 20 are sequentially laid on either face of the negative electrode collector layer 50. However, the configuration of the power generation elements 100 is not limited thereto, so long as each power generation element 100 is provided with a positive electrode layer 20, a solid electrolyte layer 30 and a negative electrode layer 40. For instance, the power generation elements 100 may be configured so that each includes one positive electrode layer 20, one solid electrolyte layer 30, one negative electrode layer 40, and one arbitrary negative electrode collector layer 50.

In the illustrated example, the positive electrode layer 20 has a positive electrode active material layer 22 and an insulating layer 24 formed at edges of the positive electrode active material layer 22. As in the illustrated example, the positive electrode layer 20 may be made up of the positive electrode active material layer 22 and a functional layer such as the insulating layer 24; alternatively, the positive electrode layer 20 may be made up of the positive electrode active material layer 22 alone.

The positive electrode active material layer 22 contains a positive electrode active material.

A known material used in all-solid-state batteries can be used as the positive electrode active material. Examples of the positive electrode active material include lithium-transition metal composite oxides such as lithium-nickel composite oxides, lithium-cobalt composite oxides, lithium-manganese composite oxides, lithium-nickel-cobalt composite oxides, lithium-nickel-manganese composite oxides, lithium-nickel-cobalt-manganese composite oxides and the like; as well as lithium composite compounds having olivine structure such as $LiFePO_4$.

The average particle size of the positive electrode active material is not particularly limited, but is, for instance, not less than 0.5 μm and not more than 20 μm, desirably not less than 1 μm and not more than 10 μm.

The positive electrode active material layer 22 may further contain a solid electrolyte. Examples of the solid electrolyte include the same as those of the solid electrolyte used in the solid electrolyte layer 30 described below.

The positive electrode active material layer 22 may further contain, as needed, a conductive material (for example, carbon black such as acetylene black, graphite, vapor-grown carbon fibers (VGCFs) or carbon nanotubes), and a binder (for example, a fluorine-based binder such as polyvinylidene fluoride (PVDF) or polyethylene terephthalate (PTFE), or a rubber-based binder such as styrene butadiene rubber (SBR)).

The thickness of the positive electrode active material layer 22 is not particularly limited, but is, for instance, not less than 0.1 μm and not more than 1000 μm, desirably not less than 10 μm and not more than 500 μm.

In the present embodiment, the dimension of the positive electrode active material layer 22 is smaller than the dimension in the negative electrode active material layer of the negative electrode layer 40 in a direction perpendicular to the stacking direction Y of the power generation elements 100 (i.e., in the direction of the main surface of the power generation elements 100). In the present embodiment, therefore, the formation range of the negative electrode active material layer is larger than the formation range of the positive electrode active material layer 22. Such a configuration allows suppressing precipitation of metallic lithium.

In the present specification, the term "main surface" denotes the surface with the largest area.

The dimension of the positive electrode active material layer 22 is set to be smaller than the dimension of the negative electrode active material layer of the negative electrode layer 40, in a direction perpendicular to the stacking direction Y of the power generation elements 100, and as a result, a space arises at edges of the positive electrode active material layer 22. In the present embodiment, therefore, the insulating layer 24 is disposed in that space. Short-circuits between the positive electrode collector 110 and the negative electrode layer 40 can be prevented by the insulating layer 24.

The insulating layer 24 is made up of an insulating material, specifically, for instance, a resin material or an inorganic material.

Both a thermoplastic resin (for example, an acrylic resin or polypropylene) and a thermosetting resin, but desirably a thermoplastic resin, can be used herein as the resin material. Thermoplastic resins are advantageous in terms of making it possible to easily form the insulating layer 24 by being applied in a molten state, and being then cooled.

Herein, a UV curable resin (for example, a UV curable acrylic resin) containing a polymerizable monomer and a photopolymerization initiator can be used as the resin material. Such UV curable resins are advantageous in that they allow easily forming the insulating layer 24 through application and UV irradiation.

Examples of inorganic materials include inorganic oxides such as alumina ($Al_2O_3$), magnesia (MgO), silica ($SiO_2$) and titania ($TiO_2$); nitrides such as aluminum nitride and silicon nitride; metal hydroxides such as calcium hydroxide, magnesium hydroxide and aluminum hydroxide; clay minerals such as mica, talc, boehmite, zeolites, apatite and kaolin; and glass fibers. The foregoing can be used singly or in combinations of two or more types. Alumina and boehmite are desired among the foregoing. In a case where the insulating layer 24 is made up of an inorganic material (in particular an inorganic filler), the insulating layer 24 may contain a binder (for example, a fluorine-based binder such as PVDF or PTFE, or a rubber-based binder such as SBR). The case where the insulating layer 24 is made up of an inorganic material is advantageous in terms of the high mechanical strength of the insulating layer 24.

The insulating layer 24 may have a multilayer structure. For instance, the insulating layer 24 may have a base material layer and a pressure-sensitive adhesive layer. Accordingly, the insulating layer 24 may be a pressure-sensitive adhesive tape or pressure-sensitive adhesive sheet having a base material layer and a pressure-sensitive adhesive layer. The case where the insulating layer 24 is made up of a pressure-sensitive adhesive tape or a pressure-sensitive adhesive sheet is advantageous in that the insulating layer 24 is easily formed uniformly to a desired thickness in that case.

The dimensions of the insulating layer 24 are not particularly limited, so long as the insulating layer 24 can fulfill the function of preventing short-circuits. The laminated battery 200 is used under application of a restraint load. Desirably, therefore, a restraint load is applied to the positive electrode active material layer 22, while no restraint load is applied to the insulating layer 24. Therefore, the thickness of the insulating layer 24 is typically equal to or smaller than the thickness of the positive electrode active material layer 22, and is desirably smaller than the thickness of the positive electrode active material layer 22. The thickness of the insulating layer 24 is more desirably 98% or less of the thickness of the positive electrode active material layer 22, and yet more desirably 96% or less of the thickness of the positive electrode active material layer 22. On the other hand the thickness of the insulating layer 24 is desirably 20% or more, more desirably 30% or more, and yet more desirably 40% or more, of the thickness of the positive electrode active material layer 22, since in that case short-circuit prevention performance is higher.

The solid electrolyte layer 30 contains a solid electrolyte.

A known solid electrolyte used in all-solid-state batteries may be used herein as the solid electrolyte. Examples of the material that makes up the solid electrolyte include sulfide solid electrolyte materials, oxide solid electrolyte materials, nitride solid electrolyte materials and halide solid electrolyte materials. Examples of sulfide solid electrolyte materials include sulfide materials such as $Li_2S$—$P_2S_5$-based materials (for example, a sulfide solid electrolyte produced through mixing of $Li_2S/P_2S_5$ (mass ratio)=50/50 or higher, in particular at a ratio of 70/30), $Li_2S$—$GeS_2$-based materials, $Li_2S$—$GeS_2$—$P_2S_5$-based materials, $Li_2S$—$SiS_2$-based materials, $Li_2S$—$B_2S_3$-based materials, $Li_3PO_4$—$P_2S_5$-based materials and the like. For instance, a material may be used (for example, LiI—$Li_2S$—$P_2S_5$, LiCl—LiI—$Li_2S$—$P_2S_5$, LiBr—LiI—$Li_2S$—$P_2S_5$, LiI—$Li_2S$—$SiS_2$ or LiI—$Li_2S$—$B_2S_3$) that results from adding a lithium halide to the above sulfide materials. Examples of oxide solid electrolyte materials include lithium-lanthanum-zirconium-containing composite oxides (LLZO), Al-doped LLZO, lithium-lanthanum-titanium-containing composite oxides (LLTO), Al-doped LLTO and lithium phosphate oxynitride (LIPON).

The average particle size of the solid electrolyte is not particularly limited, but is, for instance, not less than 0.1 μm and not more than 10 μm, desirably not less than 0.3 μm and not more than 5 μm.

The solid electrolyte layer 30 may further contain a binder (for example, a fluorine-based binder such as PVDF or PTFE, or a rubber-based binder such as butadiene rubber (BR) or SBR).

The thickness of the solid electrolyte layer 30 is not particularly limited, but is, for instance, not less than 0.1 μm and not more than 1,000 μm, desirably not less than 0.1 μm and not more than 300 μm.

In the present embodiment, the entirety of the negative electrode layer 40 is configured as a negative electrode active material layer. The negative electrode layer 40 may be made up of a negative electrode active material layer and a functional layer.

The negative electrode active material layer that makes up the negative electrode layer 40 contains a negative electrode active material.

A known material used in all-solid-state batteries can be used as the negative electrode active material. Examples of negative electrode active materials include carbon-based negative electrode active materials such as graphite, hard carbon, soft carbon and carbon nanotubes; Si-based negative electrode active materials such as Si, silicon oxide, silicon carbide and silicon nitride; and Sn-based negative electrode active materials such as tin, tin oxide, tin nitride and tin-containing alloys.

The average particle size of the negative electrode active material is not particularly limited, but is, for instance, not less than 1 μm and not more than 20 μm, desirably not less than 2 μm and not more than 10 μm.

Unless otherwise stated, the term "average particle size" in the present specification denotes a particle size (also referred to as $D_{50}$ particle size; median size) corresponding to a cumulative 50%, from the fine particle side, in a volume-basis particle size distribution obtained from a particle size distribution measurement based on a laser diffraction-light scattering method.

The negative electrode active material layer may further contain a solid electrolyte. Examples of the solid electrolyte include the same as those of the above solid electrolyte used in the solid electrolyte layer 30

The negative electrode active material layer may further contain, as needed, a conductive material (for example, carbon black such as acetylene black, vapor-grown carbon fibers (VGCFs) and carbon nanotubes), and a binder (for example, a fluorine-based binder such as PVDF or PTFE, or a rubber-based binder such as SBR).

The thickness of the negative electrode layer 40 is not particularly limited, but is, for instance, not less than 0.1 μm and not more than 1000 μm, desirably not less than 10 μm and not more than 500 μm.

The negative electrode collector layer 50 is typically made up of a metallic material that does not form readily alloys with Li and which has good conductivity. Examples of the metallic material include Cu, Ni, Fe, Ti, Co, Zn and alloys (for example, stainless steel) containing at least one of these metals; the metallic material is desirably Cu. The negative electrode collector layer 50 is desirably made up of a foil-like body, and is particularly suitably made up of a copper foil.

The negative electrode collector layer 50 may further have other layers in addition to the layer of the above metallic material.

The thickness of the negative electrode collector layer 50 is not particularly limited, but is desirably not less than 5 μm and not more than 50 μm, and more desirably not less than 8 μm and not more than 40 μm, in terms of the trade-off between the capacity density of the battery and collector strength.

As illustrated in FIG. 1, the laminated battery 200 is provided with a positive electrode collector 110 as a first collector. The positive electrode collector 110 is interposed between one power generation element 100 and a power generation element 100 adjacent thereto. That is, the power generation elements 100 are stacked across respective positive electrode collectors 110.

As in the illustrated example, the positive electrode collector 110 may be further provided as each outermost layer.

The positive electrode collector 110 is typically made up of a metallic material having good conductivity. Examples of the above metallic material include Al, Ni, Cr, Pt, Fe, Ti, Zn and alloys (for example, stainless steel or nitrogen-containing alloys) containing at least one of these metals; the metallic material is desirably Al. The positive electrode collector 110 is suitably made up of a foil-like body, and is particularly desirably made up of an aluminum foil.

The positive electrode collector 110 may further have other layers in addition to the layer of the above metallic material. Examples of other layers include carbon coat layers (for example, a surface layer containing 15 mass % of carbon and 85 mass % of PVDF).

The dimension of the main surface of the positive electrode collector 110 in at least one direction is set to be smaller than the dimension of the main surface of the positive electrode layer 20 in the same direction. Therefore, for instance, the dimension of the positive electrode collector 110 is smaller than the dimension of the positive electrode layer 20 in either one, or both, of a direction along the a long side of a main surface of the positive electrode collector 110 (i.e., longitudinal direction of the positive electrode collector 110) and a direction along a short side of the main surface of the positive electrode collector 110 (i.e., width direction of the positive electrode collector 110).

In the illustrated example, the dimension of the main surface of the positive electrode collector 110 in the width direction is smaller than the dimension of the main surface of the positive electrode layer 20 in the width direction.

The dimension of the main surface of the positive electrode collector 110 is desirably identical to or larger than the dimension of the main surface of the positive electrode active material layer 22. As a result, current can be collected over the entire main surface of the positive electrode active material layer 22.

In a case where the positive electrode collector 110 has a collector tab, the dimension of the main surface of the positive electrode collector 110 does not factor in the collector tab.

The thickness of the positive electrode collector 110 is not particularly limited, but is desirably not less than 5 μm and not more than 50 μm, and more desirably not less than 8 μm and not more than 30 μm, in terms of the trade-off between the capacity density of the battery and collector strength.

In the present embodiment, an insulating adhesive 120 is disposed at a position crossing an edge of the positive electrode collector 110, such that the insulating adhesive 120 bonds one main surface of a respective power generation element 100 and a main surface of a power generation element 100 adjacent thereto.

Specifically, the insulating adhesive 120 is disposed at a position other than on the main surfaces of the positive electrode collector 110, and has a dimension equal to or greater than the thickness of the positive electrode collector 110, in the stacking direction Y of the power generation elements 100. The insulating adhesive 120 bonds one main surface of the positive electrode layer 20 of the power generation element 100 and a main surface of a positive electrode layer 20 of a power generation element 100 adjacent thereto.

Such a configuration affords superior current collection properties since current can be collected from the entire surface, of the positive electrode collector 110, in contact with the positive electrode active material layer 22.

In some techniques, power generation elements are laid up, and are then fixed through sealing of the sides of the resulting stack of power generation elements. In such techniques, however, stacking deviations are prone to occur, since sealing is performed after stacking. Moreover, fixing of the power generation elements by sealing is difficult in a case where the thickness of the battery is small. In addition, the energy efficiency of the resulting laminated battery is low, since an insulating sealing material occupies the edges of the stack of the power generation elements 100. In the present embodiment, however, fixing is carried out each time that one power generation element is laid up, and hence stacking deviations do not occur readily. Further, the power generation elements can be fixed easily also in a case where the thickness of the laminated battery 200 is small. In addition, volume energy efficiency is high since bonding is carried out by utilizing the volume of the gaps between the power generation elements 100.

The insulating adhesive 120 may be disposed at positions separated from the positive electrode collector 110. However, the insulating adhesive 120 is desirably disposed in contact with a side face of the positive electrode collector 110, since the members that make up the laminated battery 200 (i.e., the power generation elements 100 and the positive electrode collector 110) are fixed firmly in that case. Desirably, therefore, the insulating adhesive 120 bonds one main surface of the positive electrode layer 20 of a respective power generation element 100 with a main surface of the positive electrode layer 20 of a power generation element 100 adjacent thereto, as well as with the side face of the positive electrode collector 110.

Part of the insulating adhesive 120 may protrude beyond the gaps between the power generation elements 100. That is, an outer edge portion of the insulating adhesive 120 may protrude from the side face of the laminated battery 200. Desirably, however, the whole of the insulating adhesive 120 is present within the gaps between two respective power generation elements 100, as in the illustrated example. That is, desirably the insulating adhesive 120 does not protrude beyond the side face of the laminated battery 200.

For instance, hot-melt adhesives (for example, ethylene-vinyl acetate copolymer (EVA)-based ones, and polyolefin-based ones such as low density polyethylene (LDPE) one or the like); epoxy resin-based adhesives; acrylic resin-based adhesives; urethane resin-based adhesives; silicone resin-based adhesives; rubber-based adhesives; and UV curable-type adhesives, can be used as the insulating adhesive 120.

The laminated battery 200 is used by being restrained. Since the insulating adhesive 120 can be easily compressed to a desired dimension by the restraint load, an adhesive having a low modulus of elasticity is desirably used as the insulating adhesive 120. Specifically, a hot-melt adhesive or a UV curable-type adhesive is desired as the insulating adhesive 120. The modulus of elasticity of the insulating adhesive 120 is desirably 20 MPa or less.

Figure 3:
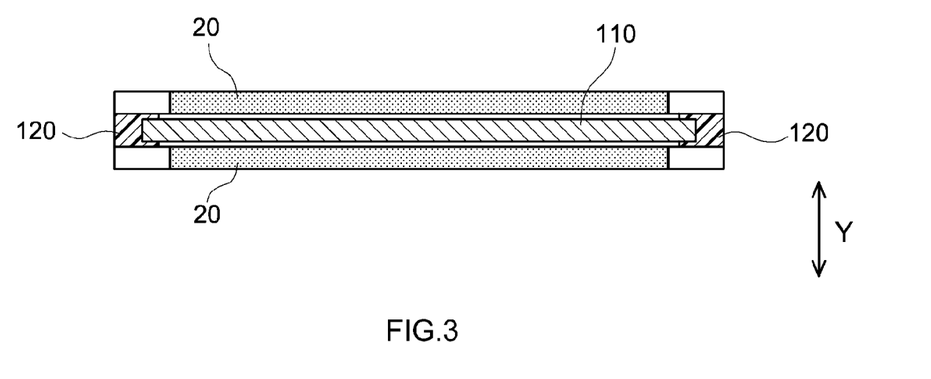
FIG. 3 is a schematic cross-sectional diagram illustrating a variation of the configuration of a laminated battery according to an embodiment of the present disclosure.

FIG. 3 illustrates a variation of the present embodiment. In the variation illustrated in FIG. 3, only the positive electrode layer 20, the positive electrode collector 110 and the insulating adhesive 120 are depicted. In this variation, the dimension of the insulating adhesive 120 in direction Y (i.e., the stacking direction of the power generation elements 100) is larger than the dimension of the positive electrode collector 110 in direction Y (i.e., than the thickness of the positive electrode collector 110). In this implementation, bonding reliability is higher since the insulating adhesive 120 can be brought more readily into contact with the main surface of the power generation elements 100.

Figure 4:
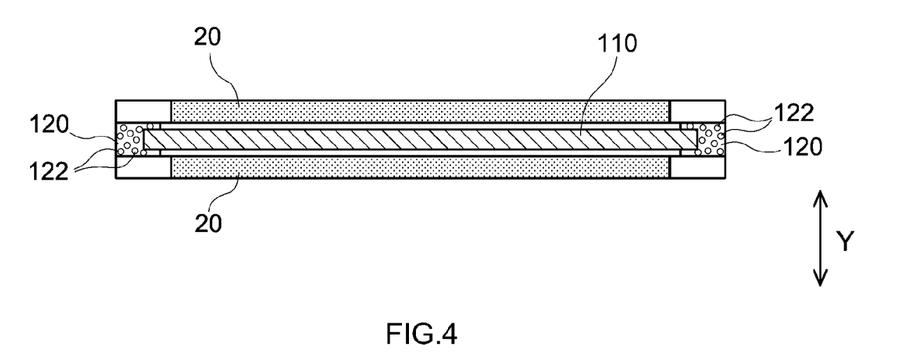
FIG. 4 is a schematic cross-sectional diagram illustrating another variation of the configuration of a laminated battery according to an embodiment of the present disclosure.

FIG. 4 illustrates another variation of the present embodiment. In the variation illustrated in FIG. 4, only the positive electrode layer 20, the positive electrode collector 110 and the insulating adhesive 120 are depicted. In this variation, the insulating adhesive 120 has voids 122 in the interior thereof. The voids 122 are formed, for instance, by bubbles, hollow resin particles or the like.

The laminated battery 200 is restrained while in use. The insulating adhesive 120 is thus compressed by a restraint pressure, but the dimension of the insulating adhesive 120 may exhibit significant changes with respect to the desired dimension, as a result of excessive deformation of the insulating adhesive 120. In a case where the insulating adhesive 120 has voids in the interior thereof, however, excessive dimensional changes of the insulating adhesive 120 derived from the restraint pressure can be suppressed by closure of the voids due to the restraint pressure.

A combination of the variation illustrated in FIG. 3 and of the variation illustrated in FIG. 4 is yet more advantageous.

The laminated battery 200 may be configured so that the positive electrodes and the negative electrodes are swapped with respect to those in the illustrated example. For instance, the laminated battery 200 may have a configuration in which a first collector is a negative electrode collector, the first electrode layer is a negative electrode layer, the second electrode layer is a positive electrode layer and the second collector layer is a positive electrode collector.

A suitable production method of the laminated battery 200 will be explained next. However, the production method of the laminated battery 200 is not limited thereto.

A suitable production method of the laminated battery 200 includes a step (hereafter also referred to as "power generation element preparation step") of preparing a plurality of power generation elements 100 each provided with the positive electrode layer 20 as the first electrode layer, the negative electrode layer 40 as the second electrode layer, and the solid electrolyte layer 30 interposed between the positive electrode layer 20 and the negative electrode layer 40; a step (hereafter also referred to as "collector arrangement step") of arranging the positive electrode collector 110 as the first collector, and the insulating adhesive 120, on the positive electrode layer 20 of one power generation element 100; and a step (hereafter also referred to as "power generation element arrangement step") of arranging another power generation element 100 on the positive electrode collector 110. Herein, the insulating adhesive 120 is disposed at a position other than on the main surface of the positive electrode collector 110 with the dimension of the insulating adhesive 120 being larger than the dimension of the positive electrode collector 110, in the stacking direction Y of the power generation elements 100.

The power generation element preparation step will be explained first. The power generation element 100 used in this production method can be prepared by being produced, for instance, in the following manner.

A coating paste containing a negative electrode active material, a binder and so forth is applied on a negative electrode collector as the negative electrode collector layer 50, and then dried to thereby form the negative electrode layer 40 (negative electrode active material layer).

A coating paste containing a solid electrolyte is next applied to the formed negative electrode layer 40, and then dried to thereby form the solid electrolyte layer 30.

Meanwhile, a coating paste containing, for instance, a positive electrode active material, a binder and so forth is applied on a release base material and then dried to thereby form the positive electrode active material layer 22 of the positive electrode layer 20.

The positive electrode active material layer 22 is laid up on the solid electrolyte layer 30, and pressure (for instance, about 100 MPa) is applied, to transfer the positive electrode active material layer 22 from the release base material to the solid electrolyte layer 30. After transfer, the release base material is stripped off the obtained stack. Pressure (for instance, about 600 MPa) may be applied to the stack, as a densification treatment, so that the materials that make up the stack come more into contact with each other.

In a case where the insulating layer 24 is to be provided at edges of the positive electrode active material layer 22, as in the illustrated example described above, the insulating layer 24 can be formed as appropriate in accordance with the type of the insulating material. As an example, the insulating layer 24 can be provided by applying a UV curable resin at edge positions of the positive electrode active material layer 22 on the solid electrolyte layer 30, and by irradiating then the UV curable resin with ultraviolet rays. In another example, the insulating layer 24 can be provided by applying a molten resin material at edge positions of the positive electrode active material layer 22 on the solid electrolyte layer 30, followed by cooling. In another example, the insulating layer 24 can be provided by applying a paste containing an inorganic filler at edge positions of the positive electrode active material layer 22 on the solid electrolyte layer 30, followed by drying. In yet another example, the insulating layer 24 can be provided by affixing a pressure-sensitive adhesive tape at edge positions of the positive electrode active material layer 22 on the solid electrolyte layer 30.

Each power generation element 100 can be thus obtained in the above manner. In this step, the power generation elements 100 are prepared in a number corresponding to the stacking number thereof.

Figure 5:
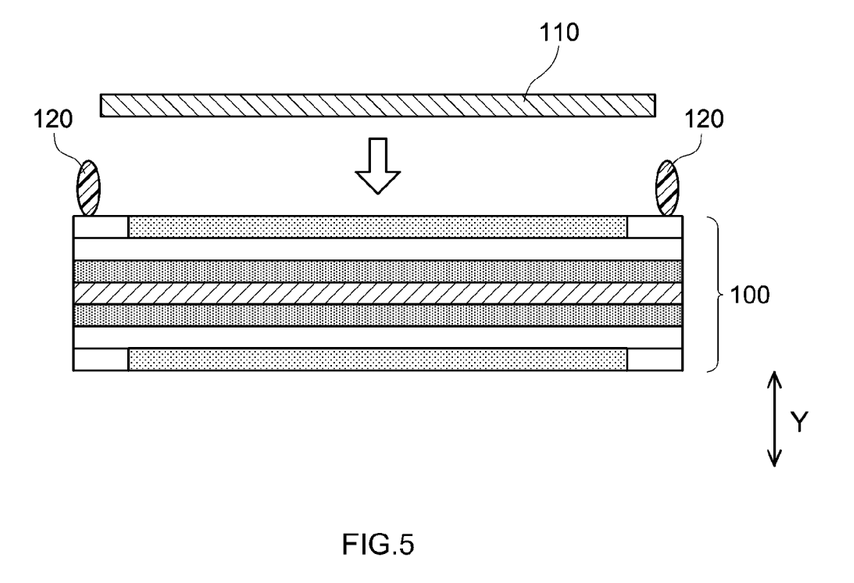
FIG. 5 is a schematic diagram illustrating a collector arrangement step in a desirable production method of the laminated battery according to an embodiment of the present disclosure.

The collector arrangement step will be explained next. FIG. 5 illustrates an outline of the collector arrangement step.

In the collector arrangement step, the positive electrode collector 110 and the insulating adhesive 120 are disposed on a main surface of the positive electrode layer 20 of the one power generation element 100 having been prepared.

The insulating adhesive 120 is disposed, on the main surface of the positive electrode layer 20, at positions other than on the main surface of the positive electrode collector 110. The insulating adhesive 120 may be apart from the positive electrode collector 110, or may be in contact with a side face of the positive electrode collector 110.

The insulating adhesive 120 is disposed so that the dimension thereof is larger than the dimension of the positive electrode collector 110 in the stacking direction Y of the power generation elements 100 (i.e., the thickness of the positive electrode collector 110).

In the illustrated example, the positive electrode collector 110 is disposed after the insulating adhesive 120 has been arranged. However, the order of arrangement of the positive electrode collector 110 and of the insulating adhesive 120 is not particularly limited. The insulating adhesive 120 may be disposed after arrangement of the positive electrode collector 110; alternatively, the positive electrode collector 110 and the insulating adhesive 120 may be arranged simultaneously.

In a case where the insulating adhesive is filled in by being supplied from a side of a stack resulting from laying up of a power generation element, a positive electrode collector and another power generation element, then the insulating adhesive intrudes readily between the positive electrode collector and the power generation elements, due to the pressure for supplying the adhesive. In a collector arrangement step such as the above, however, the insulating adhesive 120 is arranged together with the positive electrode collector 110, and as a result, the insulating adhesive 120 hardly intrude between the positive electrode collector 110 and each power generation element 100.

As in the variation illustrated in FIG. 3, the dimension of the insulating adhesive 120 can be set to be larger than the dimension of the positive electrode collector 110, in the stacking direction Y of the power generation elements 100, by increasing the thickness over which the insulating adhesive 120 is applied, or by increasing the amount of the applied insulating adhesive 120.

Further, voids can be created in the interior of the insulating adhesive 120 by mixing air into the insulating adhesive 120, or by using an insulating adhesive 120 that contains hollow resin particles.

Figure 6:
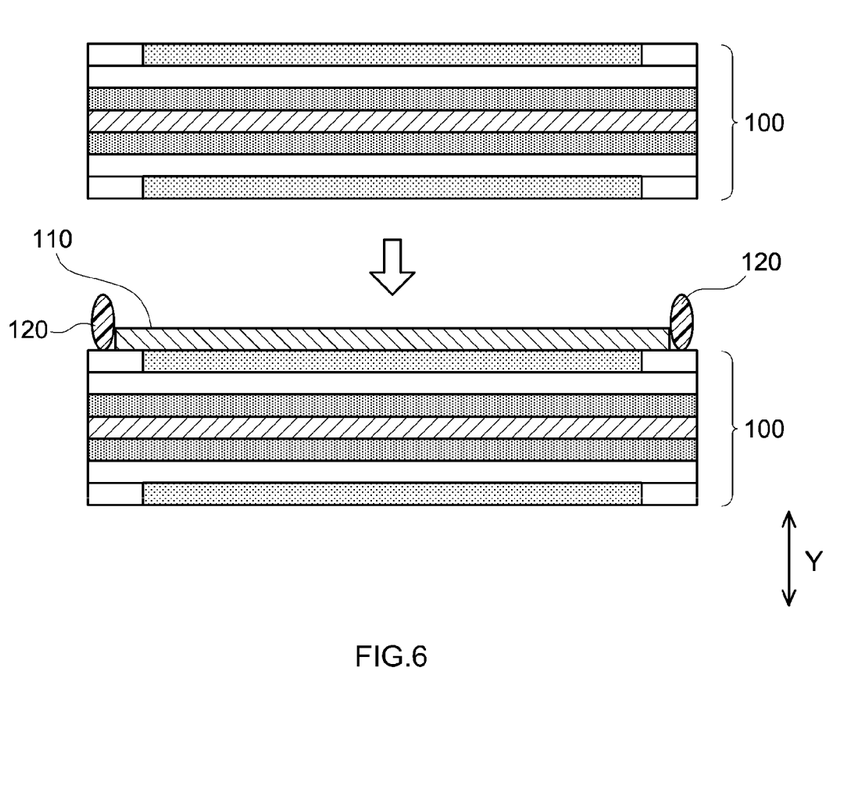
FIG. 6 is a schematic diagram illustrating a power generation element arrangement step in a desirable production method of a laminated battery according to an embodiment of the present disclosure.

The power generation element arrangement step will be explained next. FIG. 6 illustrates an outline of the power generation element arrangement step.

As in the illustrated example, another power generation element 100 is placed on the power generation element 100 having had the positive electrode collector 110 and the insulating adhesive 120 disposed thereon.

An operation of bonding the power generation elements 100 to each other may be carried out, as needed. In the bonding operation, a suitable treatment may be carried out as appropriate in accordance with the type of the adhesive. In a case, for instance, where a pressure-sensitive adhesive is used as the insulating adhesive 120, bonding can be performed by mounting the other power generation element 100, and further, a press treatment may be carried out after mounting the other power generation element 100. In a case, for instance, where a hot-melt adhesive is used as the insulating adhesive 120, placement of the other power generation element 100 is followed by a press treatment while under heating (for instance, a treatment at a temperature of about 140° C. and under a pressure of about 1 MPa). In a case, for instance, where a UV curable-type adhesive is used as the insulating adhesive 120, placement of the other power generation element 100 is followed by irradiation of the irradiation of the insulating adhesive 120 with ultraviolet rays.

Application of pressure or pressing in the above explanation can be performed, for instance, by mechanical pressing or gas pressurization.

Examples of mechanical pressing methods include a method in which a motor is driven, to thereby exert pressure on the stack in the stacking direction thereof, via a ball screw, and a method in which a motor is driven, to thereby exert pressure on the stack in the stacking direction thereof, by hydraulic pressure. In this case, energy consumption accompanying driving of the motor can be reduced to the minimum necessary through fixing of a drive part, by means of a mechanical stopper, after the pressure has been raised or lowered to a predetermined pressure.

Examples of gas pressurization methods include a method in which the stack is pressed, in the stacking direction thereof, by a pressurized gas from a gas cylinder.

As a result of performing these steps superior current collection properties are achieved since current can be collected from the entire surface, of the positive electrode collector 110, in contact with the positive electrode active material layer 22. Moreover, fixing is carried out each time that one power generation element is laid up, and hence stacking deviations do not occur readily. Also, the power generation elements 100 can be fixed easily also in a case where the thickness of the laminated battery 200 is small. In addition, volume energy efficiency is high, since bonding is carried out by utilizing the volume of the gaps between the power generation elements 100.

The above production method may further include a step (hereafter also referred to as "pressure application step") of applying pressure on the insulating adhesive 120 by applying pressure to a main surface of the power generation elements 100 towards an outward direction from an inward position of the main surface.

Figure 7:
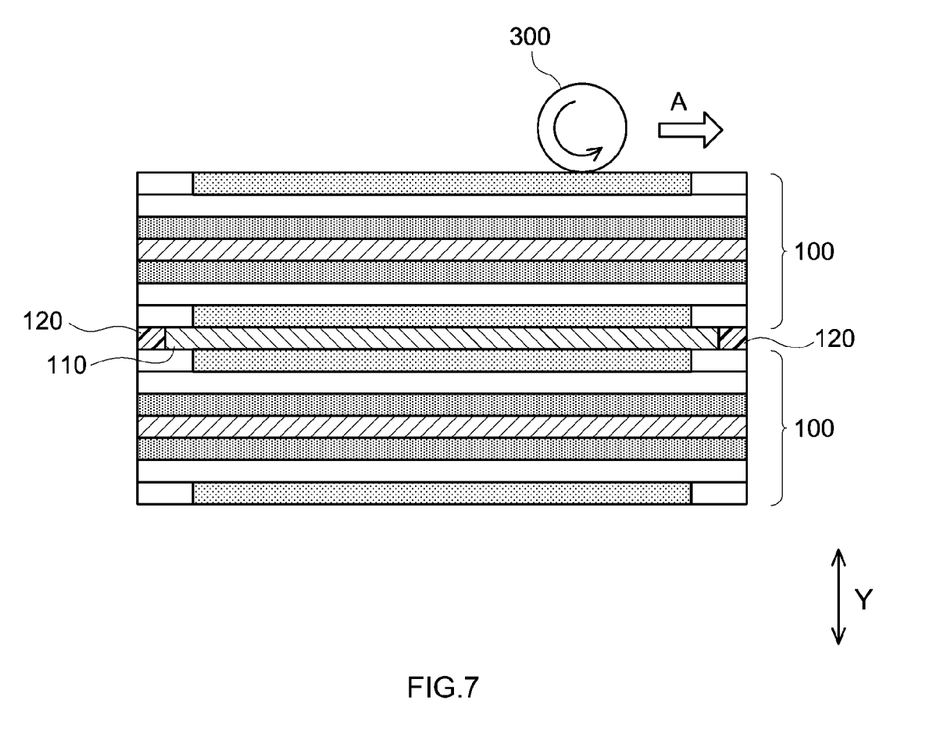
FIG. 7 is a schematic diagram illustrating a pressure application step in a desirable production method of a laminated battery according to an embodiment of the present disclosure.

FIG. 7 illustrates an outline of an example of the pressure application step. In the illustrated example, a roll 300 exerts pressure on the main surface of a power generation element 100, in an outward direction from an inward position. This pressure is applied so that pressure is exerted on the insulating adhesive 120. Specifically, the roll 300 is rotated and simultaneously caused to move in the direction of arrow A, while pressure is applied on the main surface of the power generation element 100, so that as a result pressure is in turn applied onto the insulating adhesive 120. In the pressure application step, the pressing means is desirably a roll since in that case the point at which pressure is applied can be changed; the pressing means is however not limited thereto.

As a result of this pressure application step, excess insulating adhesive 120 can be pushed out of the stack of the power generation elements 100, and in consequence the dimension of the insulating adhesive 120 in the stacking direction of the power generation elements 100 can be easily brought to a desired dimension. Moreover, the excess insulating adhesive 120 is removed easily.

A hot roll may be used as the roll 300. In this case, pressure can be easily applied while under heating. Performing the pressure application step while under heating is advantageous in that the excess insulating adhesive 120 is easily pushed out of stack of the power generation elements 100. It should be noted that a heating means other than a hot roll can also be used.

The laminated battery 200 can be obtained in the manner described above.

In a case where a positive electrode collector 110 is to be disposed on the outermost layer of the laminated battery 200, the positive electrode layer 20 at the outermost surface and the positive electrode collector 110 may be bonded through pressing, while under heating, using a hot-melt adhesive (for instance, at a temperature of about 140° C. and under a pressure of about 1 MPa).

The laminated battery 200 is used while under application of a restraint load to the battery so that the layers of the power generation elements 100 are more in contact with each other. For instance, a pressure of not less than 1 MPa and not more than 45 MPa is applied to the stack portion of the power generation elements during use of the laminated battery 200, whereas a pressure of not less than 0 MPa and not more than 1 MPa is applied to the stack portion of the power generation elements at times where the laminated battery 200 is not in use.

The laminated battery 200 can be used in various applications. Specific examples of such applications include portable power sources for personal computers, portable electronic devices, mobile terminals and the like; power sources for vehicle drive in electric vehicles (EV), hybrid vehicles (HV), plug-in hybrid vehicles (PHV) and the like; as well as storage batteries such as compact power storage devices. Among the foregoing, the laminated battery 200 is desirably a power source for vehicle drive. The laminated battery 200 can be used in the form of a battery pack resulting from connecting a plurality of the laminated batteries in series and/or in parallel.

Concrete examples of the present disclosure have been explained in detail above, but the examples are merely illustrative in nature, and are not meant to limit the claims in any way. The art set forth in the claims encompasses various modifications and alterations of the concrete examples illustrated above.

What is claimed is:

1. A laminated battery comprising a plurality of power generation elements, wherein each of the power generation elements includes a first electrode layer, a second electrode layer, and an electrolyte layer interposed between the first electrode layer and the second electrode layer, the laminated battery includes a first collector, the plurality of power generation elements are laid up via the first collector, a dimension of a main surface of the first collector in at least one direction is smaller than a dimension of a main surface of the first electrode layer in the same direction, and an insulating adhesive is disposed at a position straddling an edge of the first collector, such that the insulating adhesive bonds a main surface of one of the power generation elements and a main surface of a power generation element adjacent thereto; wherein the main surface of the first collector is a surface of the first collector with the largest surface area, wherein the insulating adhesive is disposed at a position other than on the main surface of the first collector, and wherein the direction of the main surface of the first collector is perpendicular to a stacking direction of the laminated battery.

2. The laminated battery of claim 1, wherein a dimension of the insulating adhesive is larger than a dimension of the first collector, in a stacking direction of the power generation elements.

3. The laminated battery of claim 1, wherein the insulating adhesive has voids in an interior thereof.

4. A method for producing a laminated battery, the method comprising the steps of: preparing a plurality of power generation elements each including a first electrode layer, a second electrode layer, and a solid electrolyte layer interposed between the first electrode layer and the second electrode layer; arranging a first collector and an insulating adhesive on the first electrode layer of one power generation element of the power generation elements; and arranging another power generation element of the power generation elements on the first collector, wherein the insulating adhesive is disposed at a position other than on a main surface of the first collector with a dimension of the insulating adhesive being larger than a dimension of the first collector, in a stacking direction of the power generation elements, and wherein the direction of the main surface of the first collector is perpendicular to a stacking direction of the laminated battery.

5. The method for producing a laminated battery of claim 4, further comprising the step of: applying pressure on the insulating adhesive by applying pressure to a main surface of the power generation elements towards an outward direction from an inward position of the main surface.

6. A laminate battery comprising: a plurality of power generation elements; wherein each of the power generation elements includes a first electrode layer, a second electrode layer, and a solid electrolyte layer interposed between the first electrode layer and the second electrode layer; wherein the first electrode layer comprises an electrode active material layer and a functional layer; wherein the laminated battery includes a first collector; when the first electrode layer is a positive electrode layer, the first collector is a positive electrode collector, and when the first electrode layer is a negative electrode layer, the first collector is a negative electrode collector, the plurality of power generation elements are laid up via the first collector, a main surface denotes a surface with the largest area, a dimension of a main surface of the first collector in at least one direction is smaller than a dimension of a main surface of the first electrode layer in the same direction, and an insulating adhesive is disposed at a position straddling an edge of the first collector, such that the insulating adhesive bonds a main surface of one of the power generation elements and a main surface of a power generation element adjacent thereto, wherein the insulating adhesive is disposed at a position other than on the main surface of the first collector, and wherein the direction of the main surface of the first collector is perpendicular to a stacking direction of the laminated battery.

7. A laminated battery comprising a plurality of power generation elements, wherein each of the power generation elements includes a first electrode layer, a second electrode layer, and a solid electrolyte layer interposed between the first electrode layer and the second electrode layer, the laminated battery includes a first collector and a second collector, the plurality of power generation elements are laid up via the first collector, a main surface denotes a surface with the largest area, a dimension of a main surface of the first collector in at least one direction is smaller than a dimension of a main surface of the second collector layer in the same direction, and an insulating adhesive is disposed at a position straddling an edge of the first collector, such that the insulating adhesive bonds a main surface of one of the power generation elements and a main surface of a power generation element adjacent thereto, wherein the insulating adhesive is disposed at a position other than on the main surface of the first collector, and wherein the direction of the main surface of the first collector is perpendicular to a stacking direction of the laminated battery.

* * * * *